March 13, 1951  F. P. SHAW  2,545,173
SPRING-BIASED TOOTH MOUNTING FOR ROTARY PLOWS
Filed Nov. 18, 1947  3 Sheets-Sheet 1

INVENTOR
FRANKLIN P. SHAW
BY
ATTORNEYS

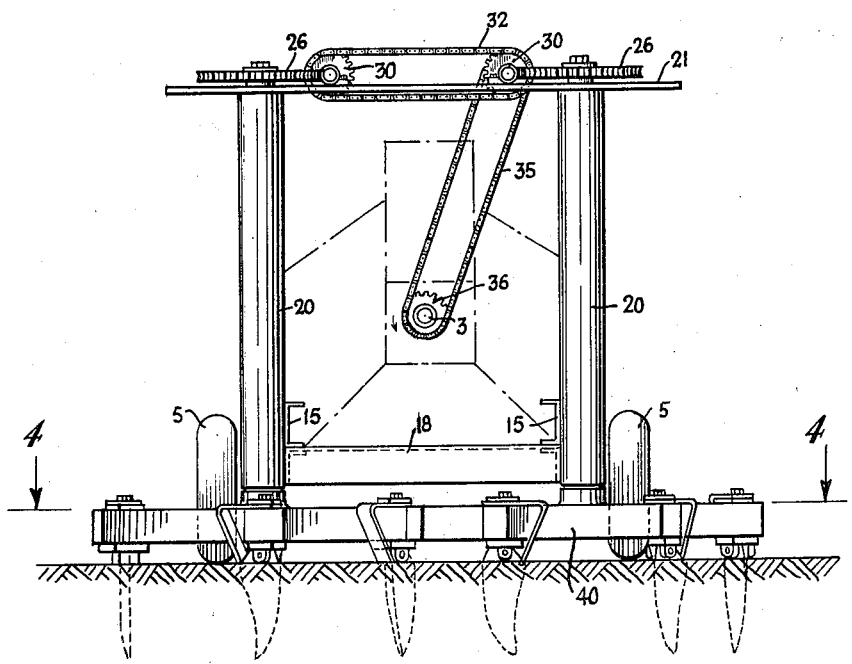
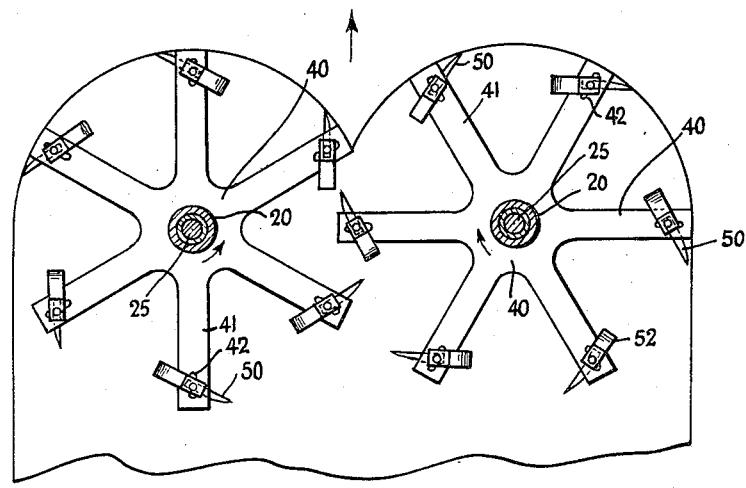

March 13, 1951 F. P. SHAW 2,545,173
SPRING-BIASED TOOTH MOUNTING FOR ROTARY PLOWS
Filed Nov. 18, 1947 3 Sheets-Sheet 3

INVENTOR
FRANKLIN P. SHAW
BY
ATTORNEYS

Patented Mar. 13, 1951

2,545,173

UNITED STATES PATENT OFFICE 2,545,173

SPRING-BIASED TOOTH MOUNTING FOR ROTARY PLOWS

Franklin P. Shaw, Barberton, Ohio

Application November 18, 1947, Serial No. 786,692

1 Claim. (Cl. 97—216)

The present invention relates to a new form of plow which not only breaks the soil but prepares it during the same operation. The new form of plow instead of turning over the earth breaks and pulverizes it in one operation. By the use of this machine the ground may be prepared for planting quicker, better and with less labor than with other methods of tillage.

The apparatus shown and described herein represents a fully operative machine embodying the principles of the invention, it being understood, however, that the machine may be redesigned and improved by those skilled in the art without departing from the principles of the invention.

In the drawings:

Fig. 3 is an elevation from the rear of the machine showing the plow teeth in the ground.

Fig. 4 is a horizontal section on the line 4—4 of Fig. 3.

Figure 7:
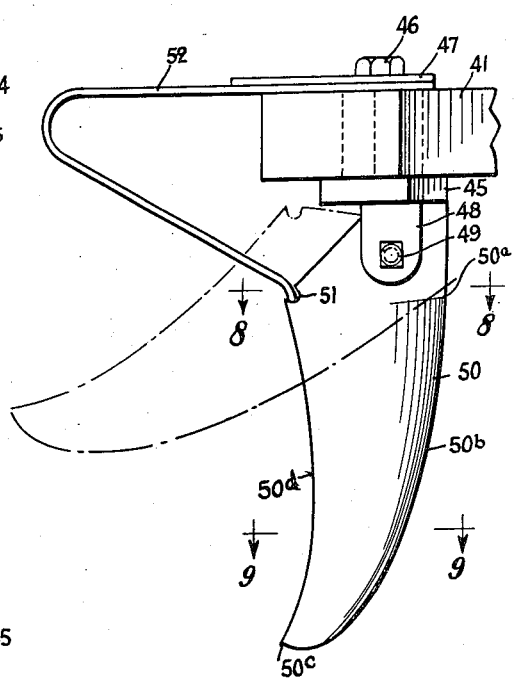
Fig. 7 is a side view of one of the teeth.
Figure 6:
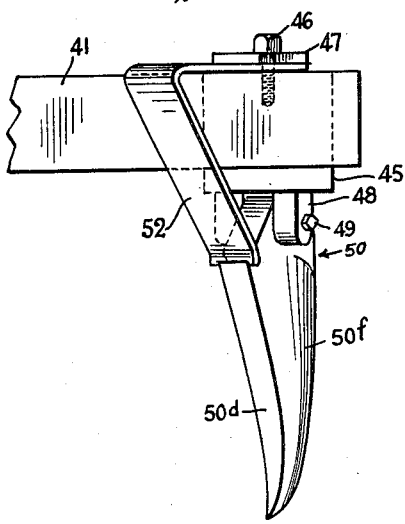
Fig. 6 is an edge view thereof.
Figure 8:
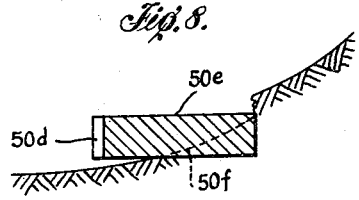
Figure 9:
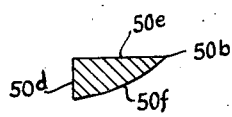

Figs. 8 and 9 are sections on the lines 8—8 and 9—9, respectively, of Fig. 7.

The plow may be self-propelled or in the form shown it is carried on a trailer body adapted to be attached to a tractor, and is provided with an individual power unit by which the plow members are rotated as the machine is moved forwardly. In the form shown in the drawings the machine is carried on a chassis or platform 1 on the forward end of which is mounted an engine 2 which drives the power shaft 3. The chassis is supported on wheels 5 which ride on the unbroken ground and are carried on an axle 7 supported at the joint pivots of two links 6 and 8, the former pivoted on the side of the chassis at 9 and the latter pivoted at 13 on a plate 10 which is in turn pivoted on the side of the chassis at 11. Threaded shafts 12, operating in nuts 14 on the plate 10 and connected at their lower ends to the links 8 shift the linkage so as to raise and lower the rear end of the chassis to lift the plow assembly above the ground or force it into the earth to whatever depth may be desired for plowing.

The plow assembly is carried on the two channels 15 which constitute the sides of the chassis and are connected and braced at the rear of the machine by the rectangular frame work 18. Welded to the chassis and to the frame work are the two upright tubular housings 20 which are surmounted by the horizontal platform 21, braces 22 extending from the platform to the frame 18.

Figure 1:
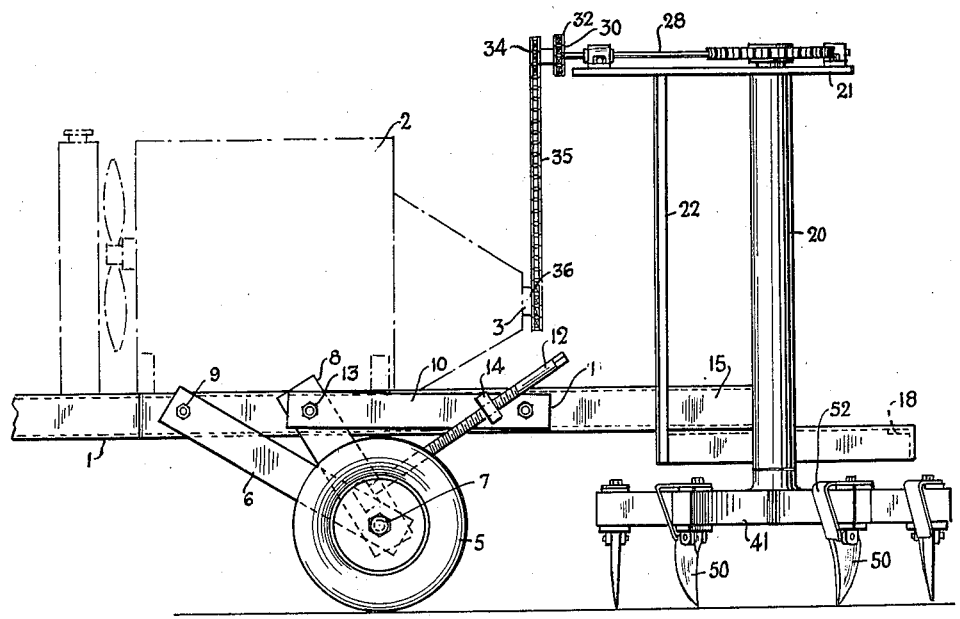
Fig. 1 is a side elevation of the machine, the power unit being shown in outline.
Figure 2:
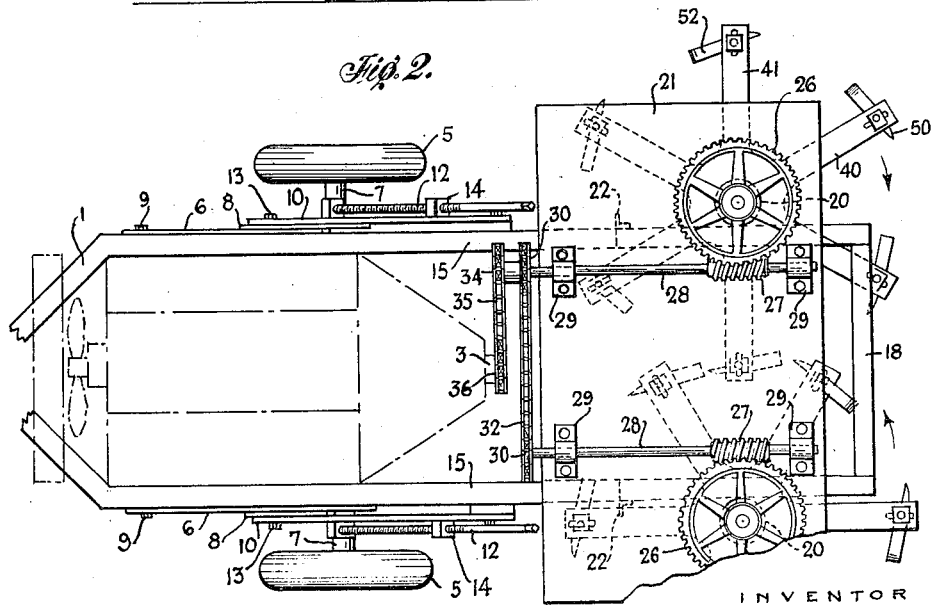
Fig. 2 is a plan view.
Figure 5:
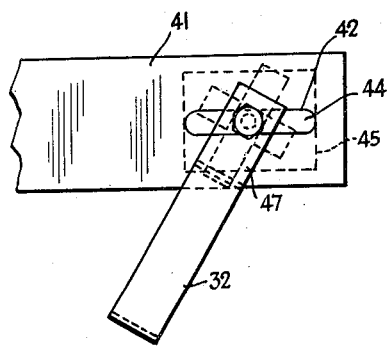
Fig. 5 is an enlarged plan view of one of the plow teeth.

A vertical plow operating shaft 25 is mounted in each housing 20, being rotatably mounted in roller bearings (not shown). To the upper end of each shaft is attached a worm gear 26 driven by a worm 27 fixed on a shaft 28 mounted in bearings 29 on the upper side of the platform 21. The shafts 28 extend forwardly of the platform where they carry sprockets 30 connected by the sprocket chain 32. One of the shafts 28 carries a second sprocket 34 which is connected by the chain 35 to a sprocket 36 on the power shaft 3. The power transmission mechanism is so designed that the vertical shafts 25 are rotated in opposite directions so that the plow teeth of each plow unit move in the direction of the arrows in Figs. 2 and 4.

The lower end of each shaft 25 carries a plow unit which comprises a horizontal head or spider 40, each spider composed of a plurality of arms 41 in the outer ends of which are mounted the plow teeth. In the form shown each spider has six arms but this number may be changed if desired. As indicated in Fig. 4, the spiders are so arranged that their orbits intersect, the arms 41 being spaced so that they do not interfere during the rotation of the spiders.

In the outer end of each arm 41 is formed a slot 42 and in this slot is located a tongue 44 forming a part of a removable block 45. The block is secured in the end of the arm by a bolt 46 threaded in the tongue 44 and a clamp plate 47. The underside of the block is provided with the two parallel depending lugs 48 through which passes the pivot pin 49 upon which the plow tooth indicated at 50 is mounted. The lugs 48 are set at an angle to the axis of the arm 41 which places each tooth in a general plane from 30° to 45° with respect to a radius of the head and causes the cutting or leading edge of the tooth to move in the orbit indicated in Fig. 4.

In order to permit each tooth to give in case it strikes a large stone or other immovable obstacle, and thus avoid breakage and yet to hold the tooth with sufficient firmness so that the forward edge of the tooth will be held in a substantially vertical position and thereby perform its function of cutting and pulverizing the earth, a heavy metal leaf spring 52 is provided for each tooth. This spring has a horizontal portion which overlies the arm 41 and is clamped between the plate 47 and arm 41. The spring is bent downwardly and forwardly so that the end of the spring which is formed with a slight hook rests in a notch 51 formed near the top and in the rear edge of the tooth. Normally the tooth will be held against the underside of the block 41 but if a tooth should strike an obstacle which offers too great resistance the tooth may rock about the pivot 49 as shown in dotted lines in Fig. 7, clearing the obstacle.

Details of the tooth construction which are quite important for successful operation are shown in the several detailed views. The tooth is preferably made of hardened steel. From a point 50$^a$ below the pivot 49 the forward or leading edge 50$^b$ is brought to a sharp edge and is curved on a relatively long radius terminating in a point 50$^c$, where it intersects the broader rear edge 50$^d$. The inner face 50$^e$ of the tooth of that face which lies on the inside of the orbit of the tooth is flat or substantially so, while the outer face 50$^f$ of the tooth is curved from the front edge 50$^b$ to the rear edge 50$^d$.

As the plow unit rotates each tooth cuts a slice out of the earth, as indicated in Fig. 8, the thickness of the slice cut by each tooth being determined by the ratio of speed of rotation of the plow units and the forward rate of advance of the machine. This is dependent upon the character of the soil. If the farmer is plowing a field of light loamy soil he may propel the tractor forwardly at a relatively high speed and cut correspondingly thicker slices with each passage of a tooth about the forward section of its orbit, while if the ground is heavy and the going more difficult he will reduce the forward speed of the machine. As all of the teeth pass repeatedly over ground which has been cut away, the earth is thoroughly pulverized in the path of the machine. Fig. 4 shows the outline of the wide furrow or swath cut out of the earth and thoroughly broken up by the repeated passages of the teeth through the soil.

The feature that the two spiders or heads rotate in opposite directions and inwardly toward the center line of the machine serves two purposes. It counterbalances the effect of the two rotating units so that the machine tends to move forwardly in a straight line rather than swerving to the right or left and it also throws the freshly cut earth toward the center of the swath so that it is repeatedly worked over before the machine passes on.

It will be appreciated that the invention is shown in its best known form as the same has been developed but this does not mean that further improvements or modifications and variations are outside of the scope or purview of the invention. The fact that the ground is thoroughly broken up and pulverized after the machine has passed over it makes it possible to attach a seeder directly to the rear of the machine so that the preparation of the soil and the seeding may be done in one operation. While two plow units are shown the number may be varied, although it is preferable to operate in multiples of two so as to balance the effect of oppositely rotating plow units.

What is claimed is:

In a mobile machine adapted for breaking and preparing ground for seeding, a pair of power driven plowing heads actuated from a common drive means and rotatable about vertical axes, each said head comprising a plurality of removable blocks located about the periphery of the head, a horizontal pivot on the under side of each of said blocks, the axis of each said pivot being located at an oblique angle with respect to a radius of the head, a tooth swingingly mounted on said pivot, and the teeth on said heads having intersecting orbital paths, the forward edge of the tooth being sharpened to provide a cutting surface, and yielding means to hold said tooth with its sharpened edge in a general vertical position, but permitting the tooth to rock about the pivot in case it strikes an obstruction.

FRANKLIN P. SHAW.

REFERENCES CITED

The following references are of record in the file of this patent:

UNITED STATES PATENTS

| Number | Name | Date |
|---|---|---|
| 75,310 | Standish | Mar. 10, 1868 |
| 493,398 | Coon | Mar. 14, 1893 |
| 802,708 | Powers et al. | Oct. 24, 1905 |
| 1,294,346 | Owens | Feb. 11, 1919 |
| 1,388,953 | Knight | Aug. 30, 1921 |
| 1,610,587 | Randolph et al. | Dec. 14, 1926 |
| 1,611,919 | Kilborn | Dec. 28, 1926 |
| 2,205,188 | Cuddigan et al. | June 18, 1940 |

FOREIGN PATENTS

| Number | Country | Date |
|---|---|---|
| 77,205 | Switzerland | Aug. 16, 1918 |
| 140,801 | Great Britain | Feb. 24, 1921 |